(12) United States Patent
Seo et al.

(10) Patent No.: US 8,588,142 B2
(45) Date of Patent: Nov. 19, 2013

(54) APPARATUS AND METHOD FOR PERFORMING A HARQ IN A MULTICARRIER SYSTEM

(75) Inventors: Dong Youn Seo, Anyang-si (KR); Joon Kui Ahn, Anyang-si (KR); Suck Chel Yang, Anyang-si (KR); Jung Hoon Lee, Anyang-si (KR); Ki Jun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 196 days.

(21) Appl. No.: 13/259,176

(22) PCT Filed: Mar. 25, 2010

(86) PCT No.: PCT/KR2010/001835
§ 371 (c)(1),
(2), (4) Date: Sep. 23, 2011

(87) PCT Pub. No.: WO2010/110607
PCT Pub. Date: Sep. 30, 2010

(65) Prior Publication Data
US 2012/0057529 A1  Mar. 8, 2012

Related U.S. Application Data

(60) Provisional application No. 61/163,436, filed on Mar. 25, 2009, provisional application No. 61/168,907, filed on Apr. 13, 2009.

(30) Foreign Application Priority Data

Mar. 24, 2010  (KR) .......................... 10-2010-0026494

(51) Int. Cl.
*H04L 1/18*  (2006.01)

(52) U.S. Cl.
USPC ............ 370/328; 714/E11.001; 714/E11.021; 714/E11.112; 714/E11.113; 714/699; 714/746; 714/748; 714/749

(58) Field of Classification Search
None
See application file for complete search history.

(56) References Cited

U.S. PATENT DOCUMENTS

| | | | |
|---|---|---|---|
| 8,332,702 B2 * | 12/2012 | Pinheiro et al. ................ | 714/748 |
| 8,429,481 B2 * | 4/2013 | Lohr et al. ..................... | 714/751 |
| 2009/0024896 A1 | 1/2009 | Tseng | |
| 2009/0300456 A1 * | 12/2009 | Pelletier et al. ............... | 714/749 |
| 2010/0050034 A1 * | 2/2010 | Che et al. ...................... | 714/748 |
| 2011/0085508 A1 * | 4/2011 | Wengerter et al. ............ | 370/329 |
| 2012/0287973 A1 * | 11/2012 | Shen et al. .................... | 375/219 |

FOREIGN PATENT DOCUMENTS

| | | |
|---|---|---|
| EP | 2209248 A2 | 7/2010 |
| KR | 10-2008-0065880 A | 7/2008 |
| KR | 10-2009-0008150 A | 1/2009 |
| WO | WO 2007/078219 A1 | 7/2007 |

\* cited by examiner

*Primary Examiner* — Charles C Jiang
*Assistant Examiner* — Amy Ling
(74) *Attorney, Agent, or Firm* — Birch, Stewart, Kolasch & Birch, LLP

(57) ABSTRACT

Provided are a method and apparatus of performing a HARQ in a multiple carrier system. A receiver determines the size of a soft buffer to be used in an effective HARQ process on the basis of the maximum number of effective HARQ processes over a plurality of component carriers and stores the received transport block in the soft buffer. The present invention enables the performance of a HARQ in an efficient manner by using multiple carriers in the event the size of the soft buffer is limited.

9 Claims, 17 Drawing Sheets

US 8,588,142 B2

APPARATUS AND METHOD FOR PERFORMING A HARQ IN A MULTICARRIER SYSTEM

CROSS REFERENCE TO RELATED APPLICATIONS

This application, which is a National Phase application of PCT/KR2010/001835 filed on Mar. 25, 2010, claims the benefit under 35 U.S.C. §119(e) of U.S. Provisional Application Nos. 61/163,436 filed on Mar. 25, 2009 and 61/168,907 filed on Apr. 13, 2009 and under 35 U.S.C. §119(a) to Patent Application No. 10-2010-0026494 filed in the Republic of Korea, on Mar. 24, 2010. The entire contents of all of the above applications are hereby incorporated by reference.

TECHNICAL FIELD

The present invention relates to wireless communications, and more particularly, to an apparatus and method for supporting multiple carriers in a wireless communication system.

BACKGROUND ART

An error compensation scheme is used to secure communication reliability. Examples of the error compensation scheme include a forward error correction (FEC) scheme and an automatic repeat request (ARQ) scheme. In the FEC scheme, errors in a receiving end are corrected by attaching an extra error correction code to information bits. The FEC scheme has an advantage in that time delay is small and no information is additionally exchanged between a transmitting end and the receiving end but also has a disadvantage in that system efficiency deteriorates in a good channel environment. The ARQ scheme has an advantage in that transmission reliability can be increased but also has a disadvantage in that time delay occurs and system efficiency deteriorates in a poor channel environment.

A hybrid automatic repeat request (HARQ) scheme is a combination of the FEC scheme and the ARQ scheme. In the HARQ scheme, it is determined whether an unrecoverable error is included in data received by a physical layer, and retransmission is requested upon detecting the error, thereby improving performance.

If the error is not detected from the received data, a receiver transmits a positive-acknowledgement (ACK) signal as a reception confirmation to report to a transmitter that reception is successful. If the error is detected from the received data, the receiver transmits a negative-acknowledgement (NACK) signal as the reception confirmation to report to the transmitter that the error is detected. The transmitter can retransmit the data upon receiving the NACK signal.

In a typical wireless communication system, only one carrier is considered even if a bandwidth between an uplink and a downlink is configured differently from each other. The carrier is defined with a center frequency and a bandwidth. A multiple carrier system uses a plurality of component carriers having a smaller bandwidth than a full bandwidth.

Long term evolution (LTE) based on $3^{rd}$ generation partnership project (3GPP) technical specification (TS) release 8 is a most dominant next mobile communication standard.

The 3GPP LTE system supports only one bandwidth (i.e., one carrier) among {1.4, 3, 5, 10, 15, 20} MHz. In order to support a full bandwidth of 40 MHz, the multiple carrier system uses two carriers having a bandwidth of 20 MHz or uses three carriers respectively having bandwidths of 20 MHz, 15 MHz, and 5 MHz.

The multiple carrier system can support backward compatibility with respect to legacy systems, and significantly increases a data rate by using multiple carriers.

The number of HARQ processors can be significantly increased in a multiple carrier system in comparison with a single carrier system. The increase in the number of HARQ processors may result in the increase in the number of HARQ processes that can be performed concurrently. However, a receive buffer size of a user equipment has to be taken into account to perform HARQ. Since the receive buffer size has an effect on manufacturing costs of the user equipment, capability of the user equipment is limited in general.

Due to the limited receive buffer size, even if the number of HARQ processes is increased, a size of a buffer for each HARQ process is decreased, which may result in the decrease in a coding gain.

SUMMARY OF INVENTION

Technical Problem

The present invention provides a method and apparatus for performing a hybrid automatic repeat request (HARQ) in a multiple carrier system.

Technical Solution

In an aspect, a method of performing a hybrid automatic repeat request (HARQ) in a multiple carrier system is provided. The method includes determining a size of a soft buffer used in an effective HARQ process based on a maximum number of effective HARQ processes over a plurality of component carriers, receiving a transport block, storing the transport block into the soft buffer, and transmitting a reception acknowledgement for the transport block.

The size $N_{IR}$ of the soft buffer may be determined by:

$$N_{IR} = \text{floor}\left(\frac{N_{soft}}{K_M \cdot \min(M_{all}, N_{CC}M_{limit})}\right),$$

where $N_{soft}$ is the total number of soft channel bits, $K_M$ is a value defined by the use of spatial multiplexing, Ncc is the number of the plurality of component carriers, $M_{all}$ is the maximum number of effective HARQ processes over Ncc component carriers, and $M_{limit}$ is a constant.

The transport block may be rate-matched according to the size of the soft buffer.

The effective HARQ process may be identified by using an HARQ indication index included in resource allocation information used for receiving the transport block.

$M_{all}$ may be greater than the number Msc of HARQ processes that can be indicated by using the HARQ indication index.

$M_{all}$ may be less than a product between Msc and Ncc.

Some of available effective HARQ processes may be shared by two or more component carriers.

In another aspect, a receiver for supporting multiple carriers includes a reception unit configured to receive a transport block, a transmission unit configured to transmit a reception acknowledgement for the transport block, and a hybrid automatic repeat request (HARQ) entity configured to determine a size of a soft buffer used in an effective HARQ process based on a maximum number of effective HARQ processes over a plurality of component carriers and store the transport block into the soft buffer.

Advantageous Effects

A hybrid automatic repeat request (HARQ) process of multiple carriers can be managed while maintaining the conventional HARQ process management mechanism. HARQ can be effectively performed by using the multiple carriers under the limitation of a receive buffer size.

MODE FOR INVENTION

Figure 1:
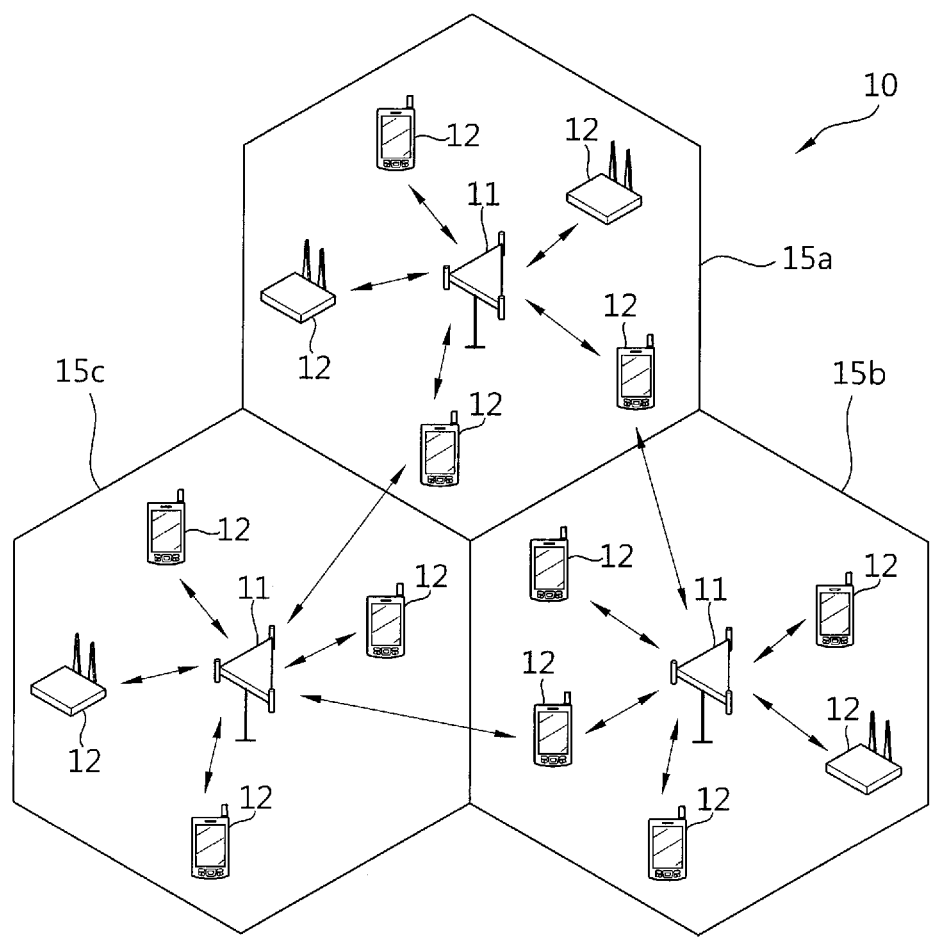
FIG. 1 shows a wireless communication system.

FIG. 1 shows a wireless communication system. A wireless communication system 10 includes at least one base station (BS) 11. The BSs 11 provide communication services to specific geographical regions (generally referred to as cells) 15a, 15b, and 15c. The cell can be divided into a plurality of regions (referred to as sectors).

A user equipment (UE) 12 may be fixed or mobile, and may be referred to as another terminology, such as a mobile station (MS), a user terminal (UT), a subscriber station (SS), a wireless device, a personal digital assistant (PDA), a wireless modem, a handheld device, etc.

The BS 11 is generally a fixed station that communicates with the UE 12 and may be referred to as another terminology, such as an evolved node-B (eNB), a base transceiver system (BTS), an access point, etc.

Hereinafter, a downlink (DL) denotes a communication link from the BS to the UE, and an uplink (UL) denotes a communication link from the UE to the BS. In the DL, a transmitter may be a part of the BS, and a receiver may be a part of the UE. In the UL, the transmitter may be a part of the UE, and the receiver may be a part of the BS.

Figure 2:
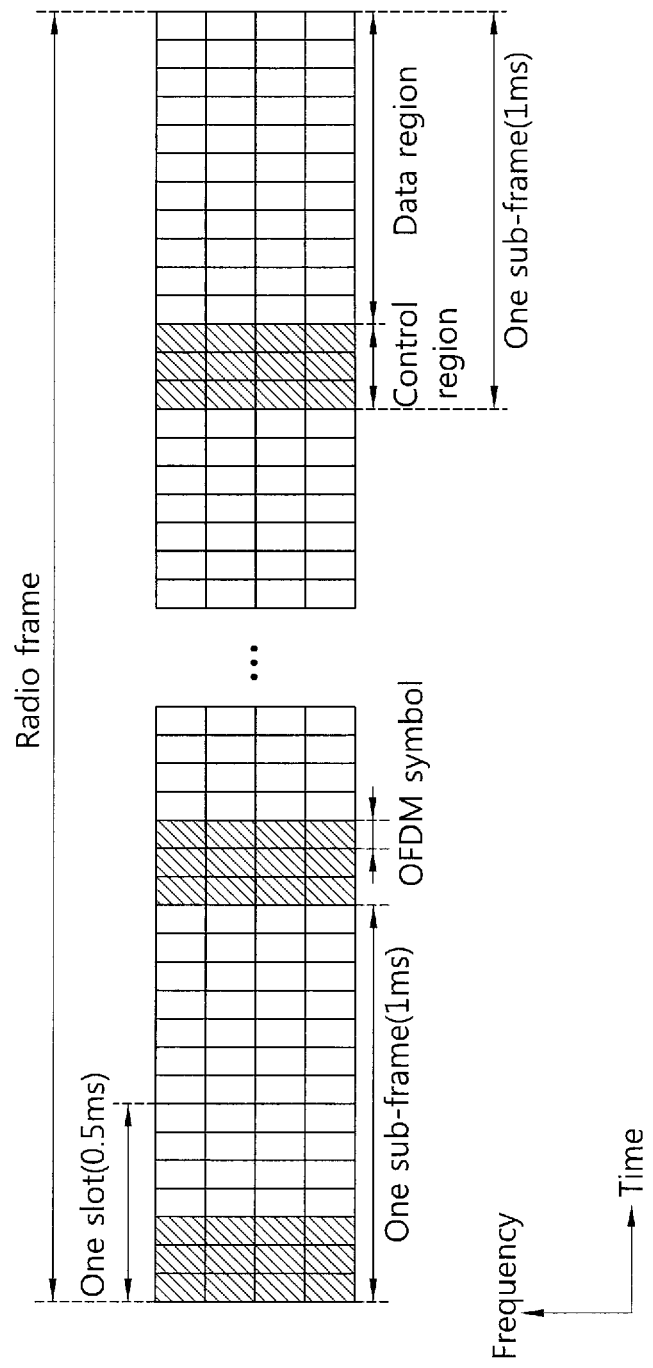
FIG. 2 shows a radio frame structure in $3^{rd}$ generation partnership project (3GPP) long term evolution (LTE).

FIG. 2 shows a radio frame structure in $3^{rd}$ generation partnership project (3GPP) long term evolution (LTE). The section 6 of 3GPP TS 36.211 V8.5.0 (2008-12) "Evolved Universal Terrestrial Radio Access (E-UTRA); Physical Channels and Modulation (Release 8)" may be incorporated herein by reference. A radio frame consists of 10 subframes indexed with 0 to 9. One subframe consists of 2 slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink, the OFDM symbol is only for expressing one symbol period in the time domain, and there is no limitation in a multiple access scheme or terminologies. For example, the OFDM symbol may also be referred to as another terminology such as a single carrier frequency division multiple access (SCFDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.5.0 (2008-12), in case of a normal CP, one subframe includes 7 OFDM symbols, and in case of an extended CP, one subframe includes 6 OFDM symbols.

A resource block (RB) is a resource allocation unit, and includes a plurality of subcarriers in one slot. For example, if one slot includes 7 OFDM symbols in a time domain and an RB includes 12 subcarriers in a frequency domain, one RB can include 7×12 resource elements (REs).

A subframe is divided into a control region and a data region in a time domain. The control region includes up to three preceding OFDM symbols of a $1^{st}$ slot in the subframe. The number of OFDM symbols included in the control region may vary. A PDCCH is allocated to the control region, and a PDSCH is allocated to the data region.

As disclosed in 3GPP TS 36.211 V8.5.0 (2008-12), the LTE classifies a physical channel into a data channel, i.e., a physical downlink shared channel (PDSCH) and a physical uplink shared channel (PUSCH), and a control channel, i.e., a physical downlink control channel (PDCCH), a physical control format indicator channel (PCFICH) and a physical hybrid-ARQ indicator channel (PHICH), and a physical uplink control channel (PUCCH).

Control information transmitted through the PDCCH is referred to as downlink control information (DCI). The DCI may include resource allocation of the PDSCH (this is referred to as a downlink grant), resource allocation of a PUSCH (this is referred to as an uplink grant), a set of transmit power control commands for individual UEs in any UE group and/or activation of a voice over Internet protocol (VoIP).

The PCFICH transmitted in a $1^{st}$ OFDM symbol in the subframe carries information regarding the number of OFDM symbols (i.e., a size of the control region) used for transmission of control channels in the subframe. The UE first receives a CFI on the PCFICH, and thereafter monitors the PDCCH.

The PHICH carries an acknowledgement (ACK)/not-acknowledgement (NACK) signal for uplink hybrid automatic repeat request (HARQ). The ACK/NACK signal for uplink data transmitted by the UE is transmitted over the PHICH.

3GPP LTE uses synchronous HARQ in UL transmission, and uses asynchronous HARQ in DL transmission. Retransmission timing is fixed in the synchronous HARQ, and is not fixed in the asynchronous HARQ. That is, in the synchronous HARQ, initial transmission and retransmission are performed based on an HARQ period.

Figure 3:
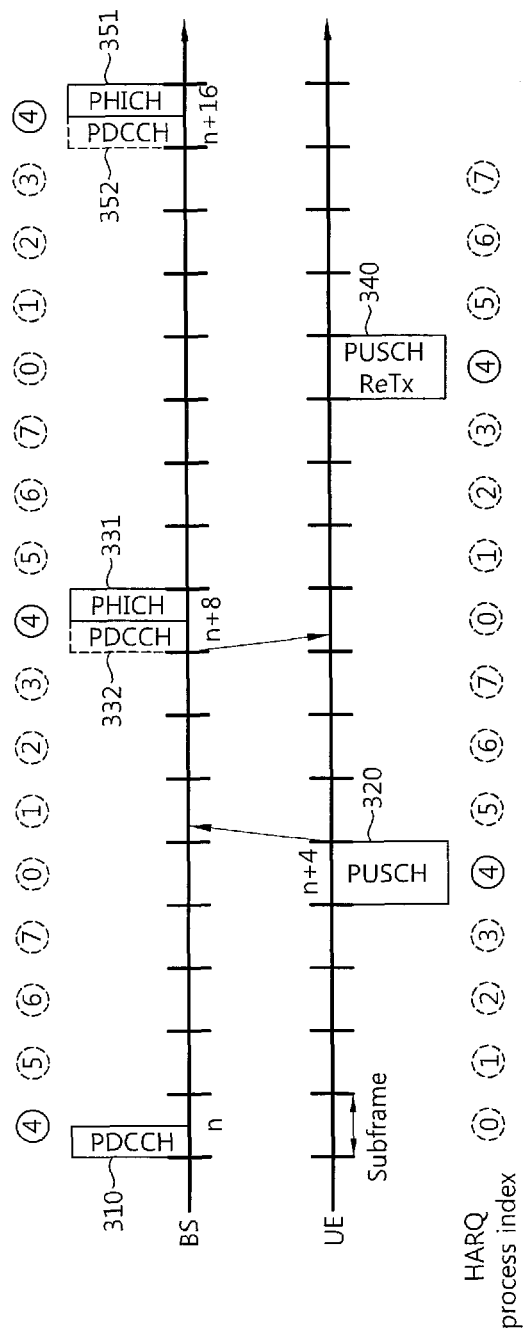
FIG. 3 shows uplink synchronous HARQ in 3GPP LTE.

FIG. 3 shows UL synchronous HARQ in 3GPP LTE.

A UE receives an initial UL resource allocation on a PDCCH 310 from a BS in an $n^{th}$ subframe.

The UE transmits a UL transport block on a PUSCH 320 by using the initial UL resource allocation in an $(n+4)^{th}$ subframe.

The BS sends an ACK/NACK signal for the UL transport block on a PHICH 331 in an $(n+8)^{th}$ subframe. The ACK/NACK signal indicates a reception confirmation for the UL transport block. The ACK signal indicates a reception success, and the NACK signal indicates a reception failure. When the ACK/NACK signal is the NACK signal, the BS may send a retransmission UL resource allocation on a PDCCH 332, or may not send an additional UL resource allocation.

Upon receiving the NACK signal, the UE sends a retransmission block on a PUSCH 340 in an $(n+12)^{th}$ subframe. For the transmission of the retransmission block, if the retransmission UL resource allocation is received on the PDCCH 332, the UE uses the retransmission UL resource allocation, and if the retransmission UL resource allocation is not received, the UE uses the initial UL resource allocation.

The BS sends an ACK/NACK signal for the UL transport block on a PHICH 351 in an $(n+16)^{th}$ subframe. When the ACK/NACK signal is the NACK signal, the BS may send a retransmission UL resource allocation on a PDCCH 352 or may not send an additional UL resource allocation.

After initial transmission performed in the $(n+4)^{th}$ subframe, retransmission is performed in the $(n+12)^{th}$ subframe, and thus synchronous HARQ is performed with an HARQ period corresponding to 8 subframes.

Therefore, in the 3GPP LTE, 8 HARQ processes can be performed, and the respective HARQ processes are indexed from 0 to 7. The aforementioned example shows a case where HARQ is performed at an HARQ process index 4.

Figure 4:
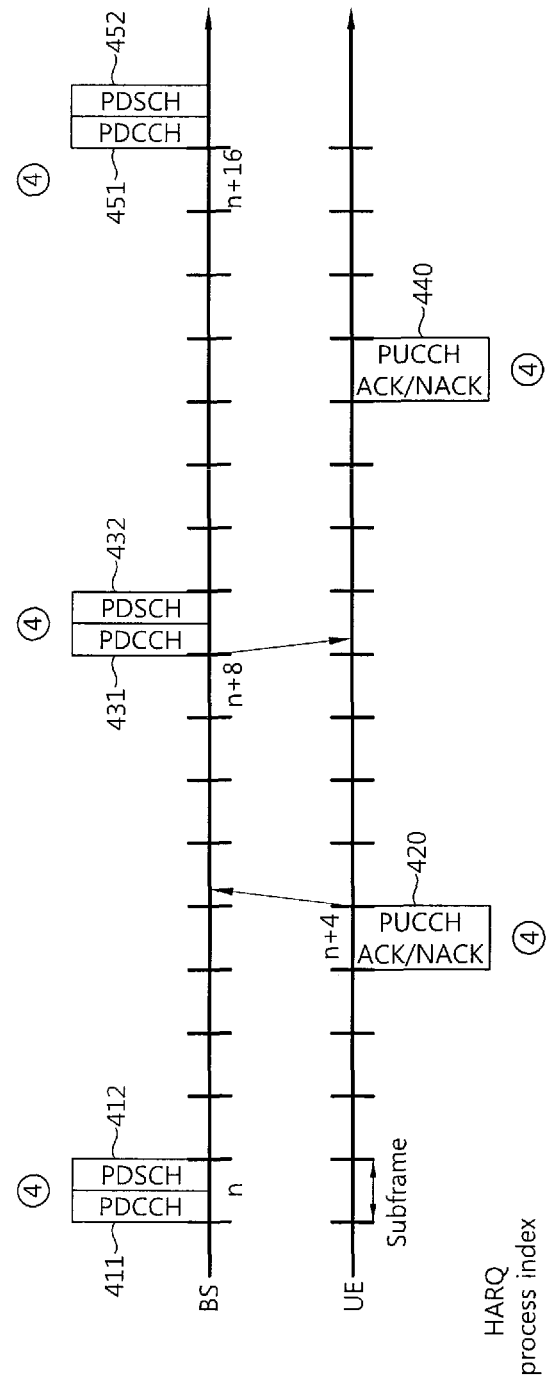
FIG. 4 shows downlink asynchronous HARQ in 3GPP LTE.

FIG. 4 shows DL asynchronous HARQ in 3GPP LTE.

A BS transmits a DL transport block to a UE on a PDSCH 412 indicated by a DL resource allocation on a PDCCH 411 in an $n^{th}$ subframe.

The UE sends an ACK/NACK signal on a PUCCH 420 in an $(n+4)^{th}$ subframe. A resource of the PUCCH 420 used in transmission of the ACK/NACK signal is determined based on a resource of the PDCCH 411 (e.g., an index of a first CCE used in transmission of the PDCCH 411).

Even if the NACK signal is received from the UE, the BS does not necessarily perform retransmission in an $(n+8)^{th}$ subframe unlike in the UL HARQ. Herein, a retransmission block is transmitted on a PDSCH 432 indicated by a DL resource allocation on a PDCCH 431 in an $(n+9)^{th}$ subframe.

The UE sends an ACK/NACK signal on a PUCCH 440 in an $(n+13)^{th}$ subframe.

According to asynchronous HARQ, the BS does not necessarily perform retransmission in a predetermined period even if a retransmission request of the UE is received.

Figure 5:
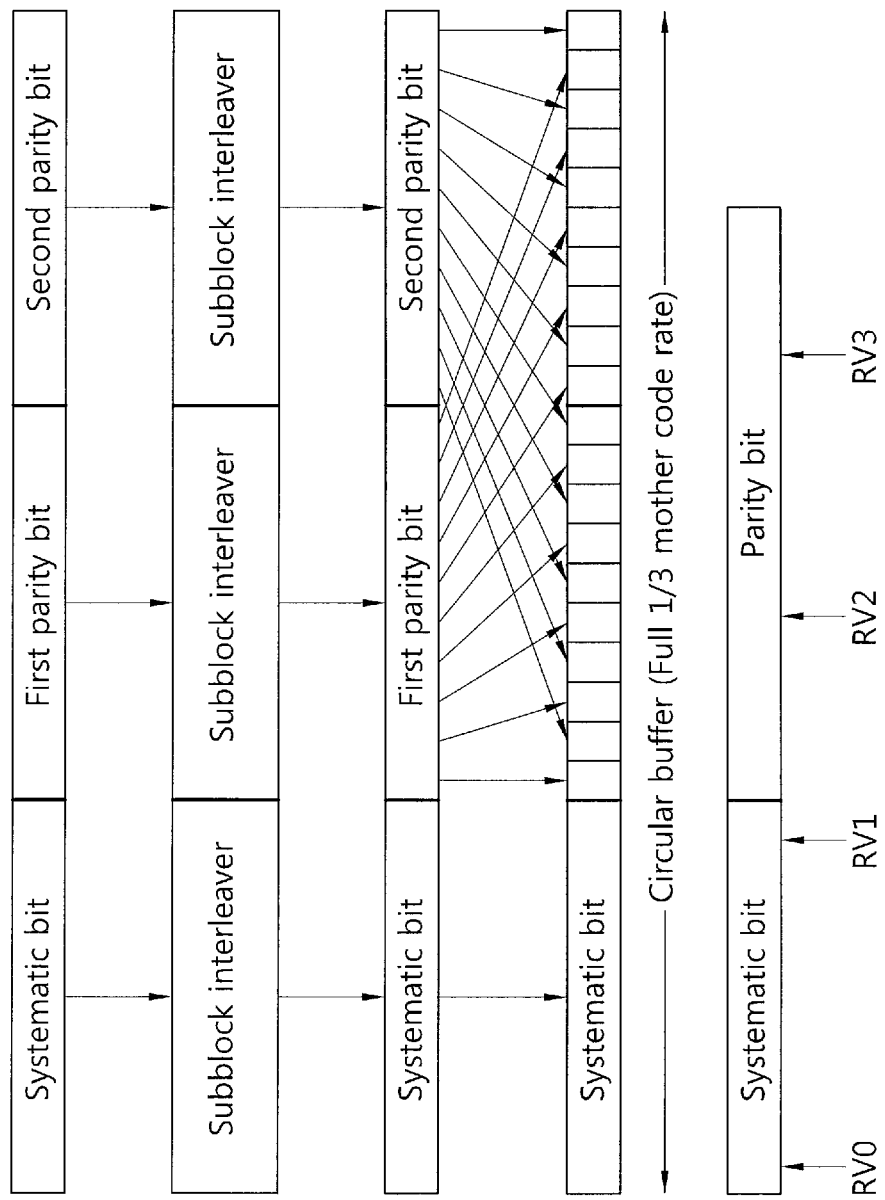
FIG. 5 shows an example of channel coding in 3GPP LTE.

FIG. 5 shows an example of channel coding in 3GPP LTE. The section 5.1 of 3GPP TS 36.212 V8.5.0 may be incorporated herein by reference.

A code block consists of systematic bits, first parity bits, and second parity bits. The code block is interleaved by using a subblock interleaver. The interleaved code block is stored in a circular buffer having a length Kw. In this case, a size of the circular buffer may be regulated according to a buffer size of a UE. The code block is rate-matched according to a size of a receive buffer of the UE.

In 3GPP LTE, an incremental redundancy (IR)-type HARQ is used, and thus a redundancy version (RV) varies in each retransmission. An initial position in a buffer for retransmission is defined according to the RV.

In addition, a receive buffer size varies depending on capability of the UE. This is to limit the receive buffer size according to the UE capability since the increase in the receive buffer size may result in the increase in manufacturing costs of the UE. A last part of a mother code may be truncated due to the limitation of the receive buffer. This is called limited buffer rate matching (LBRM).

The receive buffer is also referred to as a soft buffer, and is a logical/physical buffer allocated for each HARQ process.

A soft buffer size $N_{IR}$ for a transport block in 3GPP LTE is defined by:

$$N_{IR} = \text{floor}\left(\frac{N_{soft}}{K_{MIMO} \cdot \min(M_{HARQ}, M_{limit})}\right) \quad \text{[Equation 1]}$$

where floor(x) is a function that returns the greatest integer equal to or less than x, and min(x,y) is a function that returns a smaller value between x and y. $N_{soft}$ denotes the total number of soft channel bits, and is defined depending on the UE capability. $N_{soft}$ may have one value selected from a set of {250368, 1237248, 1827072, 3667200}. $K_{MIMO}$ denotes a value determined depending on the use of spatial multiplexing. $K_{MIMO}$ is 2 if the spatial multiplexing is used. Otherwise, $K_{MIMO}$ is 1. $M_{limit}$ is a constant, and is 8.

Now, a multiple carrier system will be described.

The 3GPP LTE system supports a case where a downlink bandwidth and an uplink bandwidth are set differently under the premise that one component carrier is used. This implies that the 3GPP LTE is supported only for a case where the downlink bandwidth and the uplink bandwidth are equal to or different from each other in a situation where one component carrier is defined for each of a downlink and an uplink. For example, although the 3GPP LTE may support up to 20 MHz and the uplink bandwidth and the downlink bandwidth may be different from each other, the 3GPP LTE supports only one component carrier for the uplink and the downlink.

Spectrum aggregation (also referred to as bandwidth aggregation or carrier aggregation) is for supporting a plurality of component carriers. The spectrum aggregation is introduced to support an increasing throughput, to prevent cost rising caused by introduction of a broadband radio frequency (RF) device, and to ensure compatibility with a legacy system. For example, when 5 carriers are assigned with a granularity of a carrier unit having a bandwidth of 20 MHz, a bandwidth of up to 100 MHz can be supported.

The spectrum aggregation can be classified into contiguous spectrum aggregation achieved between consecutive carriers in a frequency domain and non-contiguous spectrum aggregation achieved between discontinuous carriers. The number of carriers aggregated in a downlink may be different from the number of carriers aggregated in an uplink. Symmetric aggregation is achieved when the number of downlink carriers is equal to the number of uplink carriers. Asymmetric aggregation is achieved when the number of downlink carriers is different from the number of uplink carriers.

Component carriers may have different sizes (i.e., bandwidths). For example, when 5 component carriers are used to configure a band of 70 MHz, the band can be configured as 5

MHz carrier (carrier #0)+20 MHz carrier (carrier #1)+20 MHz carrier (carrier #2)+20 MHz carrier (carrier #3)+5 MHz carrier (carrier #4).

Hereinafter, a multiple carrier system implies a system supporting multiple carriers on the basis of spectrum aggregation. The multiple carrier system can use contiguous spectrum aggregation and/or non-contiguous spectrum aggregation, and also can use either symmetric aggregation or asymmetric aggregation.

Cross-carrier scheduling is possible between multiple carriers. That is, a PDSCH of the CC #2 may be indicated using a downlink grant (or an uplink grant) of a PDCCH of the CC #1. A carrier on which the PDCCH is transmitted is referred to as a reference carrier or a primary carrier. A carrier on which a PDSCH is transmitted is referred to a secondary carrier.

Figure 6:
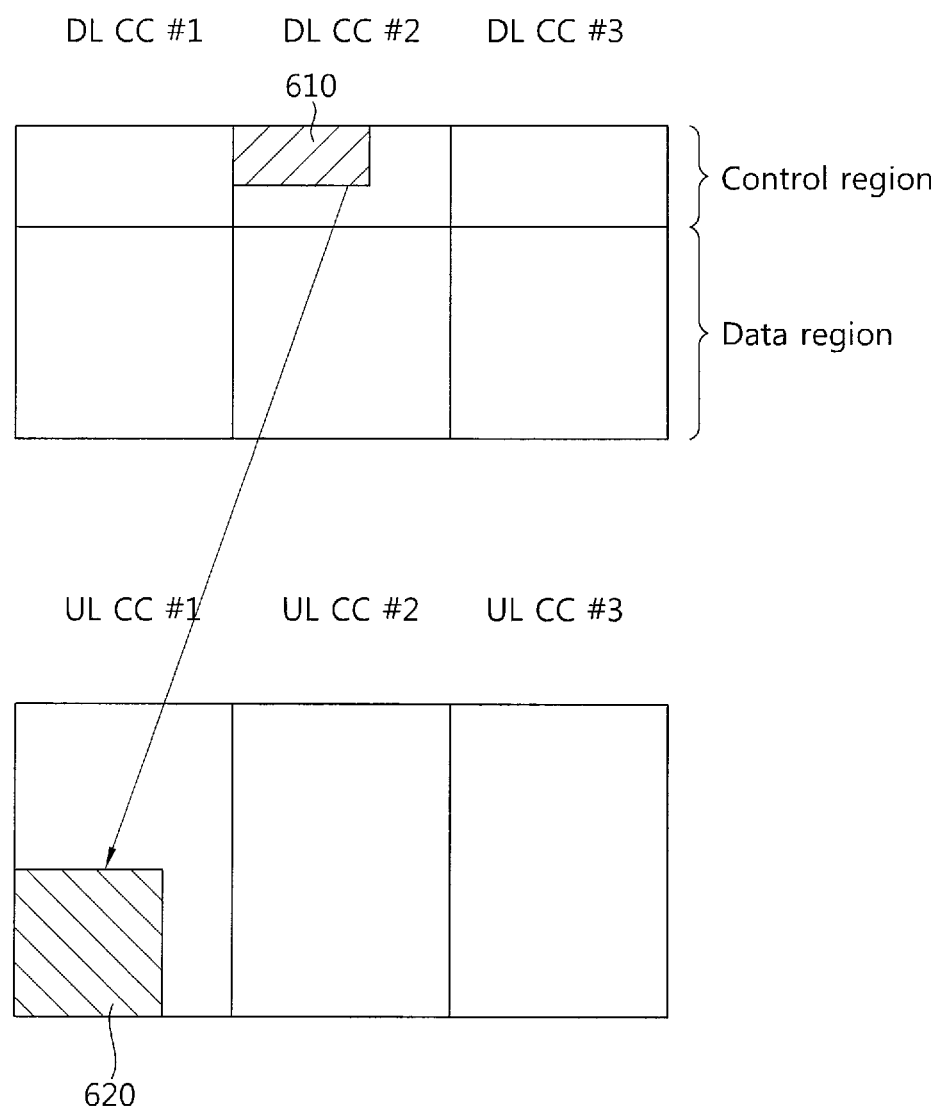
FIG. 6 shows an operation of a multiple carrier system.

FIG. 6 shows an operation of a multiple carrier system. Although 3 DL CCs and 3 UL CCs are shown for example, the number of CCs is not limited thereto. A PDCCH 610 of a DL CC #2 transmits a resource allocation for a PUSCH 620 of a UL CC #1.

A DL grant or a UL grant of the PDCCH may include at least any one of a new data indicator (NDI), an HARQ process indicator, and a carrier index (CI) shown in Table 1 below.

TABLE 1

| Field | Number of bits | Description |
|---|---|---|
| NDI (new data indicator) | 1 | toggle whether it is initial transmission or retransmission |
| HARQ process indicator | 3 | indicate index of HARQ process |
| CI (carrier index) | — | index of CC using DL grant or UL grant |

Since one CC uses 8 HARQ as described above, the HARQ process indicator may be 3-bit information.

When it is assumed that a plurality of CCs are used and each CC transmits a transport block, the number of HARQ processes may increase along with the increase in the number of CCs. When it is assumed that one CC uses 8 HARQ processes as described above, a system supporting 3 CCs may have 24 HARQ processes.

In particular, the maximum number of HARQ processes in asynchronous HARQ is important due to limited soft buffer capability of a UE. This is because the limited soft buffer size may result in the decrease in an available buffer size per HARQ process along with the increase in the maximum number of HARQ processes, and as a result, channel coding performance may decrease.

To describe the proposed method, the following parameters are defined.

$N_{CC}$: the total number of CCs that can be used by the UE

Msc: the maximum number of HARQ processes when a single CC is used

Mx: the maximum number of effective HARQ processes in an $x^{th}$ CC $M_{all}$: the maximum number of effective HARQ processes over Ncc CCs v: an HARQ process index given by using a DL grant of a PDCCH or signaling in a transmitter. This is called an HARQ indication index.

p: an index of HARQ process used for each CC. This is called an HARQ effective index.

A soft buffer size for a transport block can be determined based on $M_{all}$ in the multiple carrier system. That is, the soft buffer size may be in inverse proportion to $M_{all}$ by definition. In this case, $M_{all} \le (Msc*N_{CC})$.

Therefore, $N_{IR}$ can be defined by:

$$N_{IR} = \text{floor}\left(\frac{N_{soft}}{K_M \cdot \min(M_{all}, N_{CC}M_{limit})}\right) \quad \text{[Equation 2]}$$

where $N_{soft}$ denotes the total number of soft channel bits, and is defined depending on UE capability. $K_M$ denotes a value defined by the use of spatial multiplexing, and is equal to the maximum number of transport blocks that can be transmitted using spatial multiplexing. For example, $K_M=2$ if two transport blocks can be simultaneously transmitted through multiple antennas, and $K_M=1$ if only one transport block can be transmitted. $M_{limit}$ is a constant, and may be equal to Msc.

In order to increase the soft buffer size for the transport block, it is necessary to decrease the maximum number of effective HARQ processes over whole CCs. That is, preferably, $M_{all} < (Msc*N_{CC})$.

Although a case where $N_{CC}=4$, Msc=8, $M_{all}=20$, or $M_{all}=23$ is described for example hereinafter, the technical features of the present invention are not limited thereto.

Figure 7:
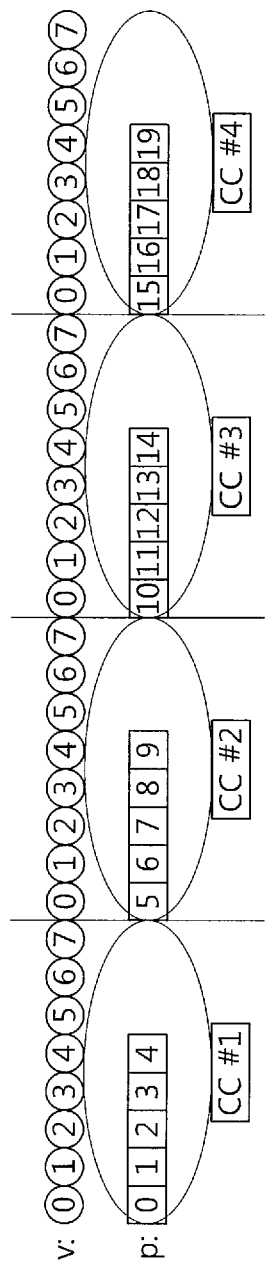
FIG. 7 shows a method of operating a hybrid automatic repeat request (HARQ) process according to an embodiment of the present invention.

FIG. 7 shows a method of operating an HARQ process according to an embodiment of the present invention. A number written inside a circle denotes an HARQ indication index v, and a number written inside a square denotes an HARQ effective index p.

For each CC, the HARQ indication index v indicates 0 to 7. For each CC, 5 effective HARQ processes are allocated. The effective HARQ process is an HARQ process that can be actually allocated to each CC, and has an HARQ effective index. Therefore, since $N_{CC}=4$, the maximum number $M_{all}$ of effective HARQ processes is defined to $M_{all}=M*N_{CC}=20$, and is indexed from 0 to 19.

If $M_{all}$ is a multiple of NCC, the number Mx of effective HARQ processes of each CC is defined by Mx=$M_{all}/N_{CC}$. If $M_{all}$ is not the multiple of NCC, the number Mx of effective HARQ processes of each CC is defined by Mx=round($M_{all}/N_{CC}$), where round(x) is a function for rounding off x to the nearest integer. In the present example, $M_1=5$, $M_2=5$, $M_3=5$, and $M_4=5$ since $M_{all}=20$ and $N_{CC}=4$.

Upon receiving $M_{all}=20$ from a BS, since the number of available CCs of the UE is 4, the UE allocates 5 effective HARQ processes for each CC.

$M_{all}$ can be announced by the BS to the UE by using a higher layer message such as an RRC message.

Figure 8:
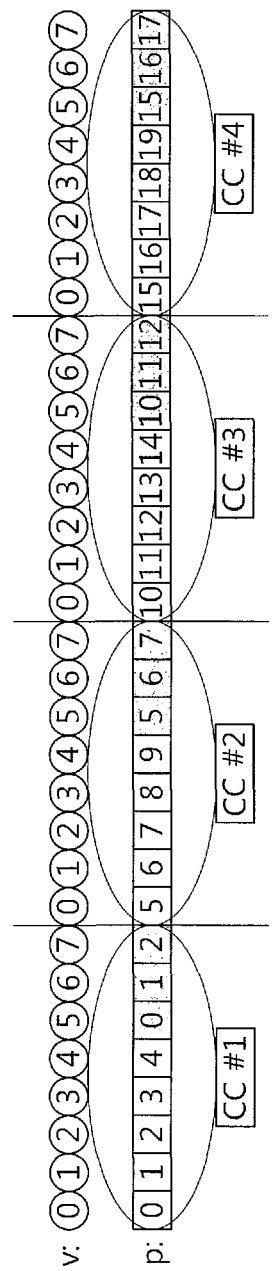
FIG. 8 shows a method of operating an HARQ process according to an embodiment of the present invention.

FIG. 8 shows a method of operating an HARQ process according to an embodiment of the present invention. In comparison with the embodiment of FIG. 7 in which there is an HARQ indication index not mapped to an HARQ effective index for each CC, the present invention shows that the same HARQ effective index can be indicated by different HARQ indication indices. For example, in a CC #1, an HARQ effective index 0 can be indicated by an HARQ indication index 0 or 5 in an overlapping manner.

When the same effective HARQ process is defined by using the different HARQ indication indices, an old buffer may be flushed and a new HARQ process may start. The effective HARQ processes operate separately even if they are indicated in an overlapping manner.

Alternatively, if the same effective HARQ process is designated by using the different HARQ indication indices, an HARQ process that operates previously can be directly performed. That is, it is recognized as the same HARQ process.

Figure 9:
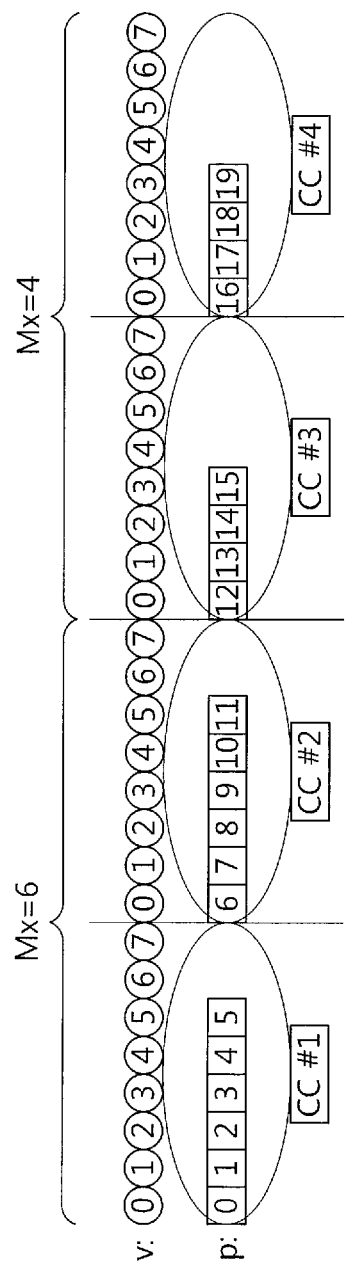
FIG. 9 shows a method of operating an HARQ process according to an embodiment of the present invention.

FIG. 9 shows a method of operating an HARQ process according to an embodiment of the present invention. In comparison with the embodiment of FIG. 7, the maximum number of effective HARQ processes can vary on a CC set basis or on a CC basis.

6 effective HARQ processes are allocated to each of a CC #1 and a CC #2 as a first set. 4 effective HARQ processes are allocated to each of a CC #3 and a CC #4 as a second set. Therefore, $M_1=M_2=6$, $M_3=M_4=4$.

The maximum number of total effective HARQ processes can be expressed by:

$$M_{all} = \sum_{x=1}^{N_{CC}} M_x = \sum_{i=1}^{N_{set}} M_{set,i} N_{set,i} \quad \text{[Equation 3]}$$

where $N_{set}$ denotes the number of CC sets, $M_{set,i}$ denotes the number of effective HARQ processes per CC in an $i^{th}$ CC set, and $N_{set,i}$ denotes the number of CCs in the $i^{th}$ CC set.

Figure 10:
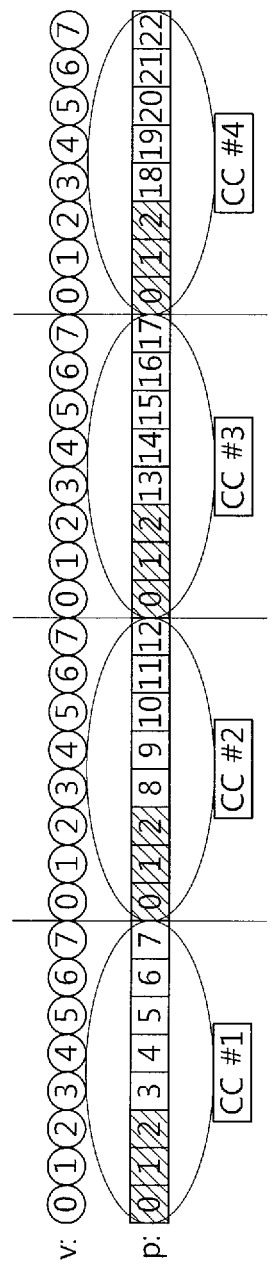
FIG. 10 shows a method of operating an HARQ process according to an embodiment of the present invention.

FIG. 10 shows a method of operating an HARQ process according to an embodiment of the present invention.

An HARQ indication index v indicates 0 to 7 for each CC. An effective HARQ process having an index {0, 1, 2} is shared by all CCs. The effective HARQ process to be shared (or overlapped) is called a shared HARQ process. The number $M_{overlap}$ of the shared HARQ processes and the index {0, 1, 2} are for exemplary purposes only, and the present invention is not limited thereto.

Among 20 effective HARQ processes, 3 effective HARQ processes can be used as shared HARQ processes, and the remaining effective HARQ processes can be uniformly allocated to each CC. The number of the remaining effective HARQ processes is 16 and $N_{cc}=4$. Thus, 4 effective HARQ processes can be allocated to each CC. As a result, 3 shared HARQ processes and 4 effective HARQ processes are allocated to each CC, and are mapped to 8 HARQ indication indices per CC.

The maximum number of total effective HARQ processes is $M_{all}=(M_{sc}-M_{overlap})N_{CC}+M_{overlap}$. Herein, $M_{all}=23$.

The HARQ indication index v and the HARQ effective index p may satisfy the following relationship.

If $0 \leq v \leq M_{overlap}-1$, p=v. Otherwise, $p=v+(n_{CC}-1)(M_{sc}-M_{overlap})$. Herein, $n_{CC}$ is a CC index from 1 to $N_{CC}$.

The above relationship can also be expressed as follows.

If $0 \leq v \leq M_{overlap}-1$, p=v. Otherwise, $p=v+(n'_{CC}-1)(M_{sc}-M_{overlap})$. Herein, $n'_{CC}$ is a CC index from 0 to $N_{CC}-1$.

Figure 11:
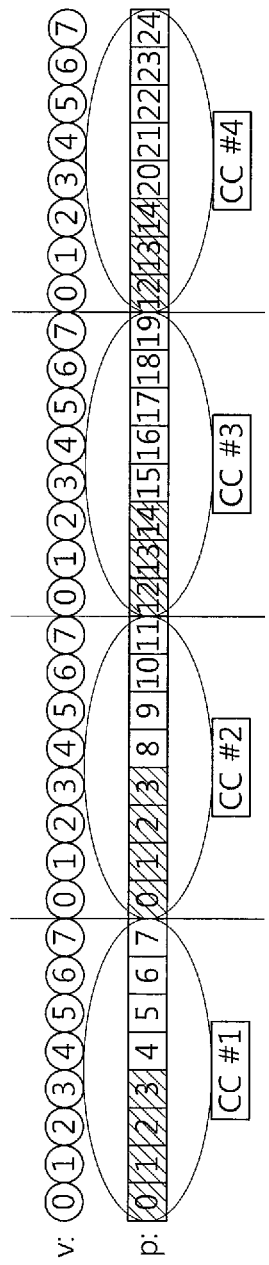
FIG. 11 shows a method of operating an HARQ process according to an embodiment of the present invention.

FIG. 11 shows a method of operating an HARQ process according to an embodiment of the present invention. In comparison with the embodiment of FIG. 10, the number of shared HARQ processes can vary on a CC set basis or on a CC basis.

4 shared HARQ processes {0, 1, 2, 3} are allocated to each of a CC #1 and a CC #2 as a first set. 3 effective HARQ processes {12, 13, 14} are allocated to a CC #3 and a CC #4 as a second set. The remaining effective processes {4, 5, 6, 7, 8, 9, 10, 11, 15, 16, 17, 18, 19, 20, 21, 22, 23, 24} can also be allocated uniformly or non-uniformly for each set. It is shown herein that 4 effective HARQ processes are allocated to each of the CC #1 and the CC #2 belonging to the first set, and 5 effective HARQ processes are allocated to each of the CC #3 and the CC #4 belonging to the second set.

The maximum number of total effective HARQ processes can be expressed by:

$$M_{all} = \sum_{x=1}^{N_{CC}} M_x = \sum_{i=1}^{N_{set}} \{(M_{sc} - M_{overlap,i})N_{set,i} + M_{overlap,i}\} \quad \text{[Equation 4]}$$

where $N_{set}$ denotes the number of CC sets, $N_{set,i}$ denotes the number of CCs in an $i^{th}$ CC set, and $M_{overlap,i}$ denotes the number of HARQ processes shared in the $i^{th}$ CC set.

Figure 12:
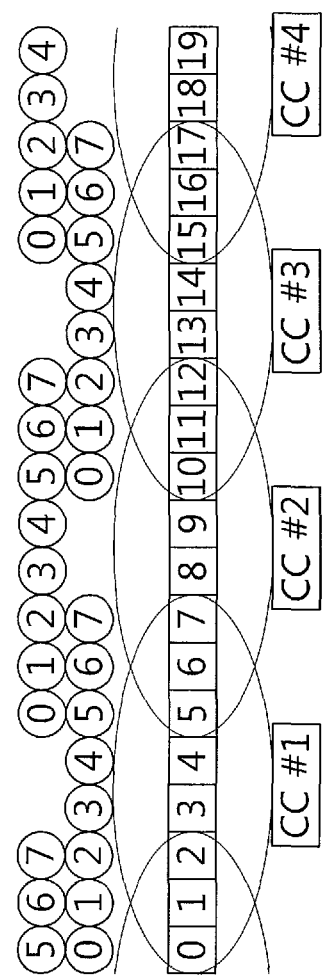
FIG. 12 shows a method of operating an HARQ process according to an embodiment of the present invention.

FIG. 12 shows a method of operating an HARQ process according to an embodiment of the present invention.

Each CC has up to 8 effective HARQ processes. Each CC shares a neighboring CC and an effective HARQ process. A CC #1 shares an effective HARQ process of {0, 1, 2} with a CC #4, and shares an effective HARQ process of {5, 6, 7} with a CC #2.

Each CC may have one or more dedicated effective HARQ processes which are not used by another CC. For example, if an HARQ indication index is {3, 4}, the CC #1 has a dedicated effective HARQ process of {3, 4}, the CC #2 has a dedicated effective HARQ process of {8, 9}, the CC #3 has a dedicated effective HARQ process of {13, 14}, and the CC #4 has a dedicated effective HARQ process of {18, 19}.

The maximum number of total effective HARQ processes can be defined by $M_{all}=(M_{sc}-M_{overlap})N_{CC}$. $M_{overlap}$ denotes the number of effective HARQ processes shared by one neighboring CC. $M_{all}=20$ since $M_{sc}=8$, $M_{overlap}=3$, and $N_{CC}=4$.

Figure 13:
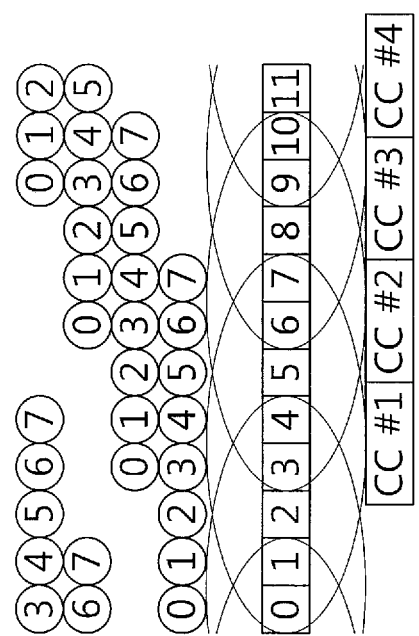
FIG. 13 shows a method of operating an HARQ process according to an embodiment of the present invention.

FIG. 13 shows a method of operating an HARQ process according to an embodiment of the present invention.

In order to reduce the maximum number of total effective HARQ processes, it is shown that the effective HARQ process can be shared by a plurality of CCs. Among effective processes {0,1,2,3,4,5,6,7} of a CC #1, {3,4,5,6,7} are shared by a CC #2, {6,7} are shared by a CC #3, and {0,1} are shared by a CC #4 for example.

The maximum number of total effective HARQ processes is $M_{all}=12$.

An HARQ indication index v and an HARQ effective index p may have a relationship of $p=\{v+(n_{CC}-1)(M_{sc}-M_{overlap})\}$ mod $M_{all}$. Herein, $n_{CC}$ denotes a CC index from 1 to $N_{CC}$.

Alternatively, $p=\{v+n'_{cc}(M_{sc}-M_{overlap})\}$ mod $M_{all}$. Herein, $n'_{CC}$ denotes a CC index from 0 to $N_{CC}-1$.

A method of sharing an effective HARQ process enables effective HARQ process mapping between CCs. A transport block initially transmitted by using a shared HARQ process through a first CC can be retransmitted through a second CC by using the same HARQ process.

If $M_{all}<(M_{sc}*N_{CC})$, an HARQ process can be shared between neighboring CCs. If the same HARQ process can be continuously performed between the CCs, a CC used in initial transmission and a CC used in retransmission can be different in the same HARQ process, thereby being able to acquire a frequency diversity gain.

A BS can schedule a flexible HARQ process to each CC under the limitation of a soft buffer size of a UE. In addition, the same HARQ process can be allocated between different CCs.

When a shared HARQ process is shared between a plurality of CCs, collision of the HARQ process may occur. The collision of HARQ implies that one HARQ process is used for HARQ of different transport blocks by the plurality of CCs. Various methods can be used to avoid the collision of HARQ.

In one example, a first transport block is transmitted initially in a first CC by using a shared HARQ process. In this case, a second CC that shares the shared HARQ process with the first CC may be restricted such that scheduling of a second transport block starts after completion of successful transmission of the first transport block.

In another example, the first transport block is initially transmitted in the first CC by using the shared HARQ process. In this case, a second CC that shares the shared HARQ process with the first CC may be restricted such that scheduling of a second transport block starts after giving up retransmission of the first transport block (that is, when retransmission is no longer performed even if transmission of the first transport block is not successful).

Figure 14:
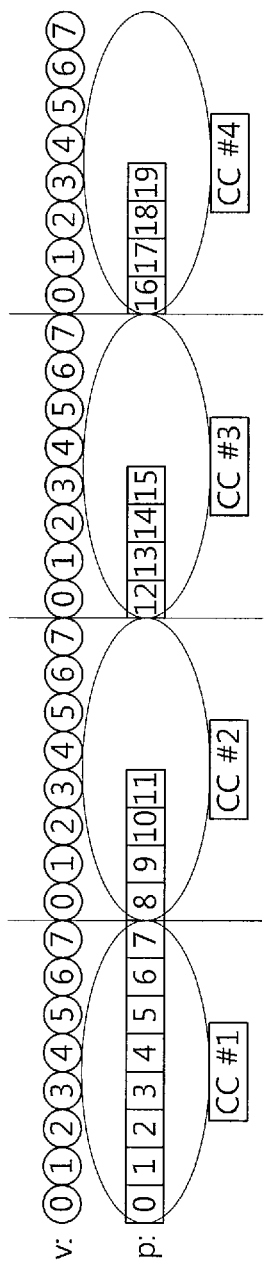
FIG. 14 shows a method of operating an HARQ process according to an embodiment of the present invention.

FIG. 14 shows a method of operating an HARQ process according to an embodiment of the present invention. In this method, a priority is given to each CC, and more effective HARQ processes are allocated to a CC having the top priority (this is called a reference CC or a primary CC). The reference CC may be a DL CC on which a PDCCH is transmitted or a DL CC corresponding to a UL CC on which a UL control signal is transmitted.

It is assumed that a CC #1 has the top priority, and a CC #2, a CC #3, and a CC #4 have the same priority. 8 effective HARQ processes are allocated to the CC #1, and 4 effective HARQ processes are allocated to each of the remaining CCs.

Figure 15:
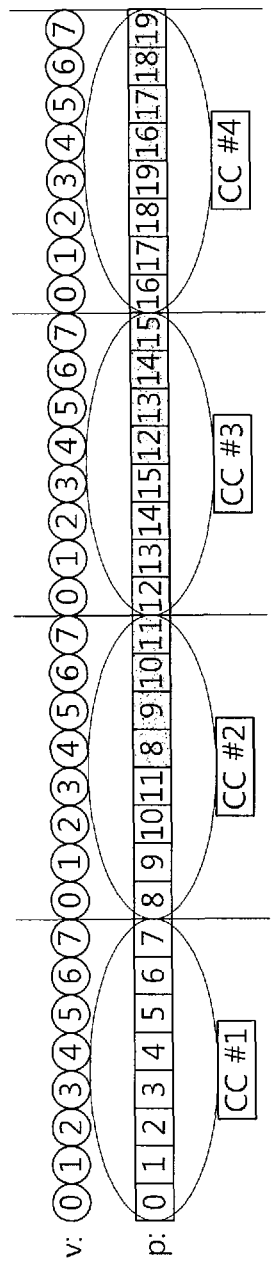
FIG. 15 shows a method of operating an HARQ process according to an embodiment of the present invention.

The aforementioned HARQ process according to the embodiments of FIG. 7 to FIG. 13 can be allocated to the remaining CCs. That is, a different number of effective HARQ processes are allocated on a CC set basis, or a shared HARQ process is allocated. FIG. 15 shows an example of applying the embodiment of FIG. 8 to the remaining CCs other than the CC #1, i.e., the reference CC.

Figure 16:
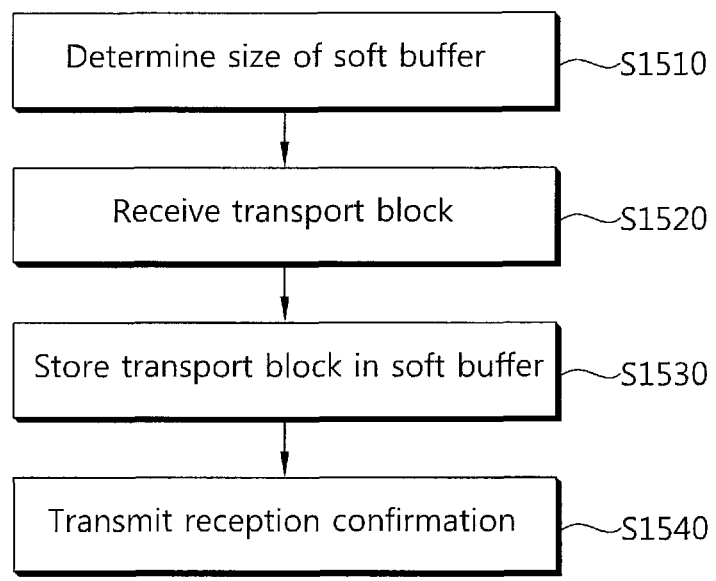
FIG. 16 is a flowchart showing a method of performing HARQ according to an embodiment of the present invention.

FIG. 16 is a flowchart showing a method of performing HARQ according to an embodiment of the present invention. This procedure can be implemented by a receiver. In DL HARQ, the receiver may be a part of a UE. In UL HARQ, the receiver may be a part of a BS.

A size of a soft buffer used in an effective HARQ process is determined on the basis of the maximum number of effective HARQ processes over a plurality of component carriers (step S1510). The size of the soft buffer (or receive buffer) can be determined by Equation 2. The maximum number $M_{all}$ of effective HARQ processes over the plurality of component carriers may be greater than the number Msc of HARQ processes that can be indicated by the HARQ indication index. The maximum number $M_{all}$ of effective HARQ processes over the plurality of component carriers may be le than product t a between Nsc and NCC. $M_{all}$ through h can be announced by a BS to a UE higher layer signaling.

A transport block is received from a transmitter (step S1520). The transport block can be rate-matched depending on the size of the soft buffer. An effective HARQ process for the transport block can be identified by using an HARQ indication index included in resource allocation information for receiving the transport block. The HARQ index mapped to the HARQ indication index can be defined by using a method of operating an HARQ process according to any one of the embodiments of FIG. 7 to FIG. 15.

The transport block is stored in the soft buffer (step S1530).

A reception confirmation of the transport block is transmitted to the transmitter (step S1540). An ACK signal is sent when the transport block is successfully received, and a NACK signal is sent when the reception of the transport block fails.

Figure 17:
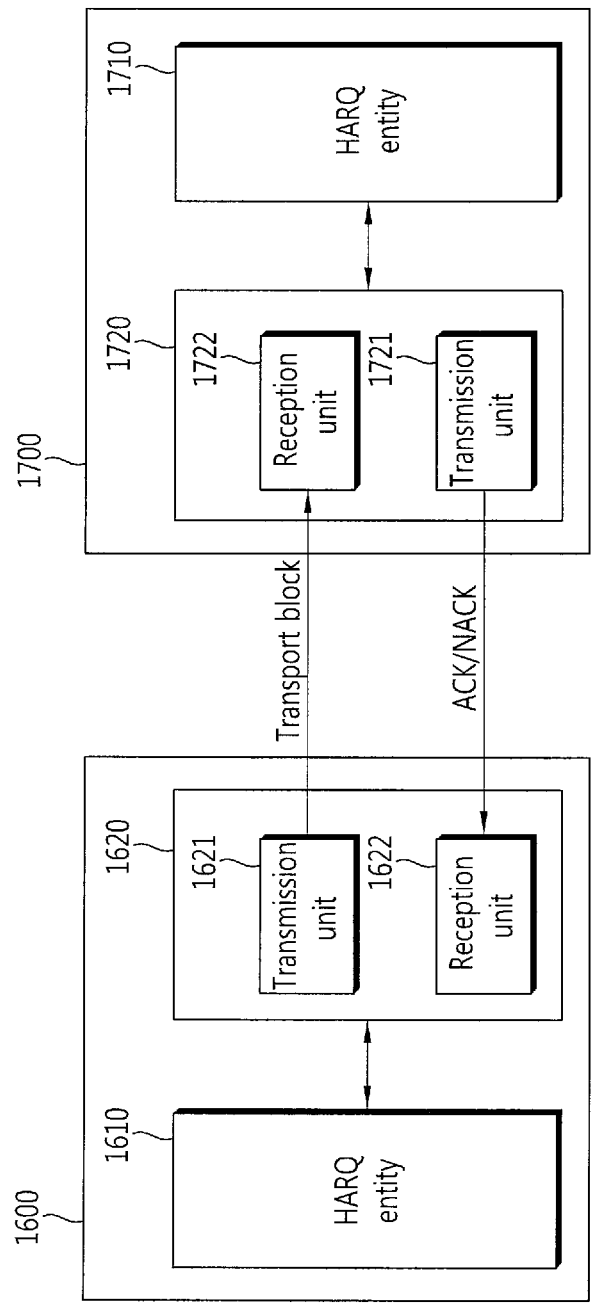
FIG. 17 is a block diagram showing a transmitter and a receiver according to an embodiment of the present invention.

FIG. 17 is a block diagram showing a transmitter and a receiver according to an embodiment of the present invention.

A transmitter 1600 supports multiple carriers, and includes an HARQ entity 1610 and a physical entity 1620. The physical entity 1620 includes a transmission unit 1621 and a reception unit 1622.

The HARQ entity 1610 determines a size of a receive buffer of a receiver 1700, and generates a transport block according to the size of the receive buffer. The size of the receive buffer can be determined by Equation 2. In addition, the HARQ entity 1610 can implement a method of operating an HARQ process according to the aforementioned embodiments of FIG. 7 to FIG. 15.

The transmission unit 1621 transmits the transport block, and the reception unit 1622 receives an ACK/NACK signal as a reception confirmation for the transport block. On the basis of the reception confirmation, the HARQ entity 1610 can retransmit the transport block.

The receiver 1700 supports multiple carriers, and includes an HARQ entity 1710 and a physical entity 1720. The physical entity 1720 includes a transmission unit 1721 and a reception unit 1722.

The HARQ entity 1710 determines a size of a receive buffer, and generates a transport block according to the size of the receive buffer. The size of the receive buffer can be determined by Equation 2. In addition, the HARQ entity 1710 can implement a method of operating an HARQ process according to the aforementioned embodiments of FIG. 7 to FIG. 15.

The transmission unit 1722 transmits the transport block, and the reception unit 1721 receives an ACK/NACK signal as a reception confirmation for the transport block. On the basis of the reception confirmation, the HARQ entity 1722 can retransmit the transport block.

The HARQ entities 1610 and 1710 can be implemented in hardware, or may be a protocol implemented by a processor (not shown). The protocol is stored in a memory (not shown), and is executed by the processor.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The above-described embodiments include various aspects of examples. Although all possible combinations for describing the various aspects may not be described, those skilled in the art may appreciate that other combinations are possible. Accordingly, the present invention should be construed to include all other replacements, modifications, and changes which fall within the scope of the claims.

The invention claimed is:

1. A method of performing a hybrid automatic repeat request (HARQ) in a multiple carrier system, the method comprising:
   determining a size of a soft buffer used in an effective HARQ process based on a maximum number of effective HARQ processes over a plurality of component carriers;
   receiving a transport block;
   storing the transport block into the soft buffer; and
   transmitting a reception acknowledgement for the transport block, wherein the size $N_{IR}$ of the soft buffer is determined by:

$$N_{IR} = \text{floor}\left(\frac{N_{soft}}{K_M \cdot \min(M_{all}, N_{CC}M_{limit})}\right),$$

where $N_{soft}$ is the total number of soft channel bits $K_m$ is a value defined by the use of spatial multiplexing, Ncc is the number of the plurality of component carriers, $M_{all}$ is the maximum number of effective HARQ processes over Ncc component carriers, and $M_{limit}$ is an integer, and wherein the effective HARQ process is identified by using an HARQ indication index included in resource allocation information used for receiving the transport block.

2. The method of claim 1, wherein the transport block is rate-matched according to the size of the soft buffer.

3. The method of claim 1, wherein $M_{all}$ is greater than the number $M_{sc}$ of HARQ processes that can be indicated by using the HARQ indication index.

4. The method of claim 3, wherein $M_{all}$ is less than a product between $M_{sc}$ and $N_{cc}$.

5. The method of claim 4, wherein some of available effective HARQ processes are shared by two or more component carriers.

6. A receiver for supporting multiple carriers, comprising:
a reception unit configured to receive a transport block;
a transmission unit configured to transmit a reception acknowledgement for the transport block; and
a hybrid automatic repeat request (HARQ) entity configured to determine a size of a soft buffer used in an effective HARQ process based on a maximum number of effective HARQ processes over a plurality of component carriers and store the transport block into the soft buffer,
wherein the HARQ entity determines the size $N_{IR}$ of the soft buffer by:

$$N_{IR} = \text{floor}\left(\frac{N_{soft}}{K_M \cdot \min(M_{all}, N_{CC}M_{limit})}\right),$$

where $N_{soft}$ is the total number of soft channel bits, $K_M$ is a value defined by the use of spatial multiplexing, Ncc is the number of the plurality of component carriers, $M_{all}$ is the maximum number of effective HARQ processes over Ncc component carriers, and $M_{limit}$ is an integer, and wherein the HARQ entity identifies the effective HARQ process by using an HARQ indication index included in resource allocation information for receiving the transport block.

7. The receiver of claim 6, wherein $M_{all}$ is greater than the number $M_{sc}$ of HARQ processes that can be indicated by using the HARQ indication index.

8. The receiver of claim 7, wherein Mall is less than a product between $M_{sc}$ and $N_{cc}$.

9. The receiver of claim 8, wherein some of available effective HARQ processes are shared by two or more component carriers.

* * * * *